March 14, 1967 J. A. TOURTELLOT 3,309,469

PHONOGRAPH PICKUP

Filed Feb. 27, 1958 2 Sheets-Sheet 1

INVENTOR.
John A. Tourtellot
BY
W. H. Spouagle
ATTORNEY.

March 14, 1967 J. A. TOURTELLOT 3,309,469

PHONOGRAPH PICKUP

Filed Feb. 27, 1958 2 Sheets-Sheet 2

INVENTOR.
John A. Tourtellot
BY
[signature]
ATTORNEY.

United States Patent Office 3,309,469

Patented Mar. 14, 1967

3,309,469
PHONOGRAPH PICKUP

John A. Tourtellot, Merchantville, N.J., assignor to Radio Corporation of America, a corporation of Delaware Filed Feb. 27, 1958, Ser. No. 717,859
2 Claims. (Cl. 179—100.41)

This invention relates to phonograph pickups, and more particularly to phonograph pickups operable to transduce the recordings of a record having two separable recordings in the same record groove.

Phonograph records have heretofore been proposed which have two separate selections, which may be stereophonically related, recorded in the same groove by using vertical undulations for one of the selections and lateral undulations for the other. Alternatively, as described in U.S. Patent 2,114,471, issued to Keller et al., the two recordings may be cut at right angles to each other in the same record groove, with each being at an angle of 45° with respect to the record surface.

Where the two recordings are stereophonically related, it is necessary for stereophonic reproduction that a phonograph pickup be provided which is capable of simultaneously transducing both recordings. As proposed heretofore, such pickups have been relatively bulky in size, and complicated to build and adjust. One reason for this is that two separate transducing systems are required which are driven by a common stylus member, thereby necessitating careful design and construction so that minimum cross-talk exists between the separate systems. Furthermore, it is desirable for stereophonic reproduction that the transducing systems have the same frequency response characteristics, or that a predetermined relation should exist between the frequency response characteristics of the two transducing systems. In prior pickups, this required that the mechanical characteristics of the two transducing systems be individually adjusted by damping, or the like, to provide substantially the same overall response.

Accordingly, it is an object of this invention to provide an improved phonograph pickup for records of the type having two separable recordings in the same record groove.

It is a further object of this invention to provide an improved phonograph pickup for stereophonic phonograph records of the type described, which is of simple and inexpensive construction and which can be easily manufactured at low cost using mass production techniques.

A further object of this invention is to provide an improved phonograph pickup for stereophonic phonograph records which is easily built to provide two transducing systems having the desired relation between the frequency response characteristics thereof.

Another object of this invention is to provide a simple and inexpensive phonograph pickup including a pair of transducing systems driven by a common stylus element which exhibits a minimum amount of cross-talk between the two transducing systems.

In accordance with the invention a pair of mechanical-to-electrical transducing elements such as piezoelectric crystals are supported in a common mounting structure which clamps, damps and accurately prepositions both transducing elements. In one embodiment of the invention one or more resilient damping blocks are provided, each of which has a pair of openings cut or molded therein for snugly receiving and positioning the two transducing elements. The damping block is held under pressure in the pickup casing so that the transducing elements are securely anchored in the proper position.

Further in accordance with the invention, vibrations imparted to a stylus arm are transmitted to the two transducing elements by a yoke member having divergent legs and a reentrant central portion. The free ends of the divergent legs which are stiff axially but flexible in all directions in a plane normal thereto, engage different ones of the transducing elements and the stylus arm is adapted to ride in the reentrant portion of the yoke member.

Since the damping blocks and the yoke member are common to both of the transducing elements, the effects thereof on the mechanical characteristics of the two transducing elements will be the same, thereby facilitating a substantially symmetrical frequency response between the two transducing systems. Furthermore, very little cross-talk exists between the two transducing systems by virtue of the simplicity of construction wherein a unitary yoke member drives the accurately prepositioned transducing elements.

From the foregoing it can be seen that a phonograph pickup for stereophonic records constructed in accordance with the invention requires no more mechanical parts (other than an additional transducing element) than are required for conventional pickups for use with records having only a single recording in the record groove. Furthermore, a pickup in accordance with the invention is compatible with existing records having a single recording cut with either vertical or lateral undulations.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 3:
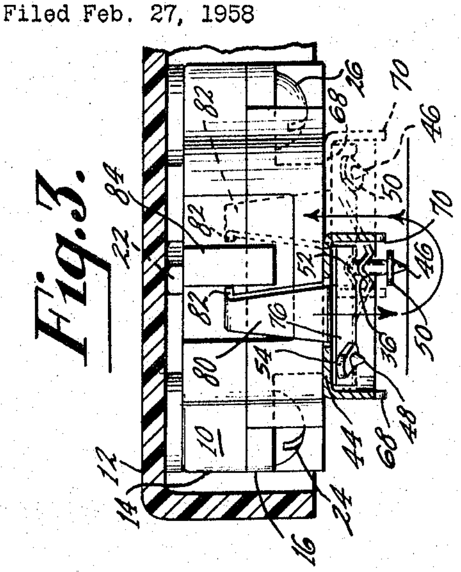
FIGURE 3 is a sectional view taken on the section lines 3—3 of the phonograph pickup shown in FIGURE 2 showing an alternate position of the stylus assembly in dotted lines.

Referring now to the drawings wherein like reference numerals will be used to designate the same components throughout, and particularly to FIGURES 1 to 4, a phonograph pickup cartridge 10 constructed in accordance with the invention is mounted near the free end of a pivotally movable tone arm 12. The pickup cartridge casing 10 includes a pair of molded Bakelite top and bottom sections 14 and 16 respectively which are held together by three rivets 18, 20 and 22. The pickup cartridge is fastened in the free end of the tone arm 12 by a pair of screws 24 and 26.

Housed within a downwardly extending cavity in the cartridge casing are a pair of elongated piezoelectric transducing elements 28 and 30 of rectangular cross-section. These transducing elements are supported by a pair of spaced rubber damping blocks 32 and 34 which have openings cut or molded therein for receiving and accurately positioning the transducing elements 28 and 30 with respect to each other. In order that the transducing elements 28 and 30 are accurately positioned with respect to the cartridge casing, the damping blocks 32 and 34 are received in a pair of grooves 37 and 38 which are formed in the bottom section 16 of the casing. The dimensions of the damping blocks 32 and 34 are made slightly greater than those of the cavity formed within the casing sections 14 and 16 so that when these sections are forced together by the rivets 18, 20 and 22, sufficient pressure is provided through the damping blocks 32 and 34 to anchor one end of the transducing elements 28 and 30 securely in position.

Since the damping blocks 32 and 34 are relatively small in size, the physical properties thereof from one end to the other do not vary appreciably, and therefore, a mechanical effects on the transducing elements due to pressure, damping, etc., are substantially the same.

For additional damping, auxiliary dampers of viscoloid or other appropriate viscous damping material may be included in the pickup casing. As is known, the proper combination of the hardness of the damping blocks 32 and 34, and viscosity of the viscous damping, may be used to control high frequency resonances; and also the low frequency compliance and Q, which can be used to control the frequency and resonant rise of mechanical impedance of the pickup and the tone arm system.

The openings in the damping blocks 32 and 34 are cut so that the major surfaces of the transducing elements 28 and 30 lie in perpendicular planes, with each plane disposed at an angle at 45° to a plane extending vertically through the longitudinal axis of the pickup casing. The free ends of the transducing elements 28 and 30 which are arranged and polarized to produce a voltage in response to a bending stress are driven by a yoke member 36 which is formed of a single piece of piano wire to have a pair of divergent legs and a reentrant central portion. The wire is of a dimension to be stiff axially, but flexible in all directions perpendicular to the axis thereof. The ends of the divergent legs of the yoke member 36 are bent over and are cemented or otherwise affixed to the respective transducing elements 28 and 30. As shown in the drawings, the yoke member lies in a plane perpendicular to the longitudinal axes of the transducing elements 28 and 30 with each of the divergent legs thereof being normal to the particular transducing element to which it is affixed. Thus the components of force applied to the yoke member 36 which are parallel to the axis of the respective legs will be readily transmitted to the transducing elements 28 and 30.

Electrical connections are provided for the transducing elements 28 and 30 by flexible conductors (not shown) which are connected between the various electrodes of these elements, and the terminals 38, 40 and 42. One of these terminals such as the terminal 40 may serve as a common terminal for both of the piezoelectric elements. If desired, four terminals may be provided, two for each transducing element. Connections from the terminals 38, 40 and 42 to the phonograph amplifier may be made in the usual manner by conductors extending along the tone arm. Thus, electrical signals corresponding to one of the separable recordings may be derived from the terminals 38 and 40, and electrical signals corresponding to the other recording may be derived from the terminals 40 and 42.

The stylus assembly for the pickup cartridge is mounted on a pivotally movable control lever 44, and includes a pair of styli 46 and 48 respectively, which may be selectively positioned in driving relation to the yoke member 36 to play different types of records. For example, the stylus 46 may be a 1 mil tip for use with conventional 45 r.p.m. and 33⅓ r.p.m. records, and the stylus 48 may be a 3 mil tip for use with conventional 78 r.p.m. records.

The stylus 46 is supported on a flattened end 50 of a stylus arm 52, and in like manner, the stylus 48 is supported on the flattened end 54 of a stylus arm 56. The opposite ends 58 and 60 of the stylus arms 52 and 56 respectively are also flattened, and are inserted into a block 62 of resilient material which provides the necessary resiliency to return the stylus arms 52 and 56 to a predetermined position. The mounting of the rear of the stylus in a rubber like material can be used to control high frequency resonances between stylus, mounting and record.

The control lever 44 pivots about a boss 64 formed on the bottom casing section 16, and is retained in position by a bifurcated bracket 66 which seats over the boss 64 and is secured to the pickup casing by the rivets 18 and 20. The control lever 44 has a central channel-shaped portion including a pair of skirts 68 and 70 which provide protection for the stylus elements and other exposed portions of the pickup structure. The skirts 68 and 70 extend down far enough so that only a small portion of the stylus and stylus arm intended for engagement with a record groove are laterally exposed. One of the skirts 68 includes a tab 72 which is bent over to retain the rubber block 62 in the proper position on the control lever 44.

An opening 74 is provided in the central portion of the control lever 44 through which the yoke member 36 extends. Forwardly, the opening in the control lever 44 is a stylus arm damping bar 76 which has a pair of V-shaped notches cut therein for receiving the stylus arm which is not in driving engagement with the yoke member 36. The yoke member 36 extends sufficiently below the control lever 44 so that the stylus arm riding in the reentrant portion thereof extends clear of the pickup cartridge structure.

The extreme forward end of the control lever 44 is bent up to form a manual control arm 78 for manually changing the stylus. If desired, a plastic knob or the like may be mounted over the manual control arm 78 as a styling feature. The control lever 44 is movable by the manual control arm 78 between either of two positions for positioning one of the other of the stylus arms 52 or 56 in the reentrant portion of the yoke member 36. The exact position of the control arm 44 is controlled by a vertically extending positioning arm 80 which may be struck-up from the control lever 44. The upper end 82 of the positioning arm 80 is bent back to extend into a U-shaped keyway 84 formed in the front surface of the pickup cartridge casing.

Figure 1:
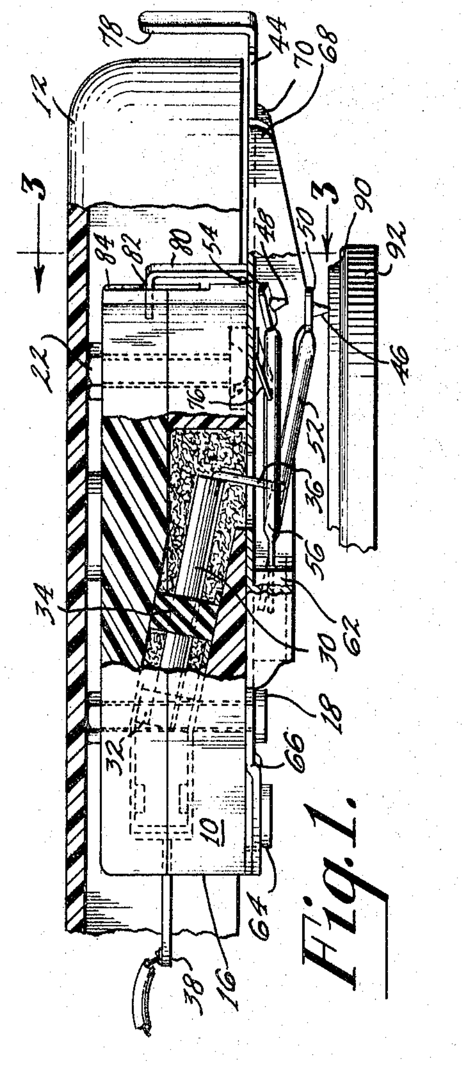
FIGURE 1 is an enlarged bottom view of a dual stylus phonograph pickup for stereophonic disc records constructed in accordance with the invention.
Figure 2:
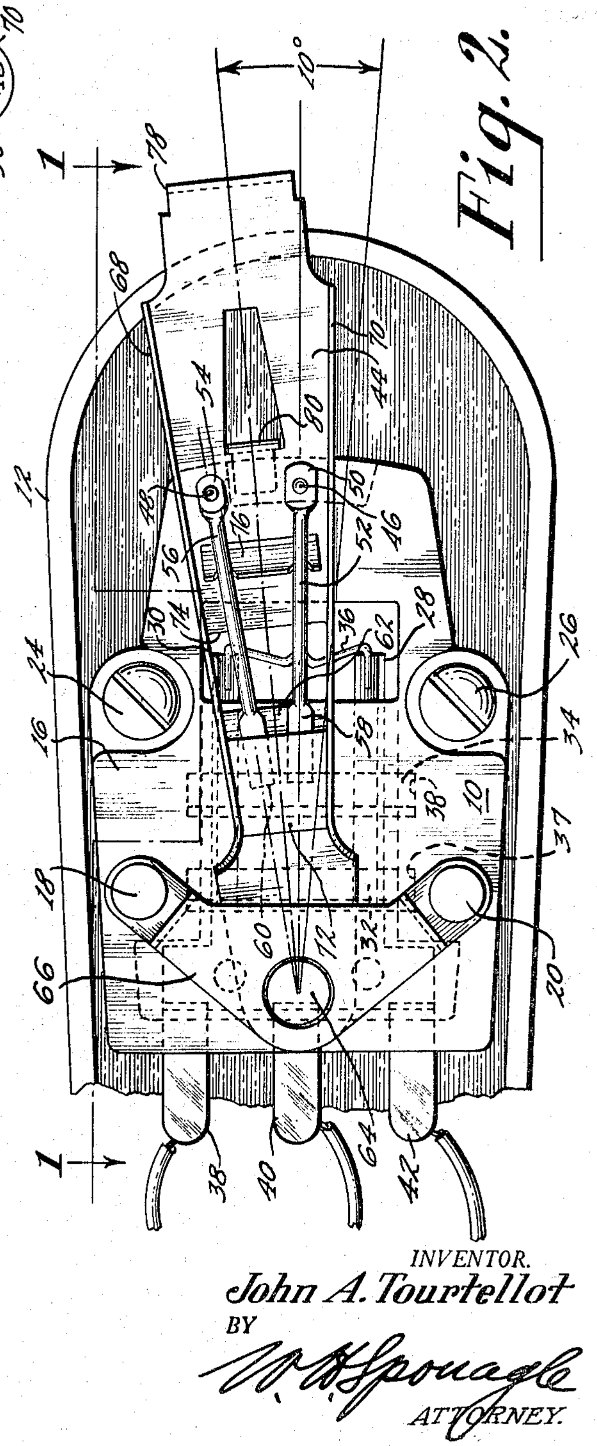
FIGURE 2 is a sectional view taken on the section lines 2—2 of the phonograph pickup shown in FIGURE 1, and showing the stylus element thereof in contact with a disc record on a record player turntable.

FIGURES 1 to 3 show the stylus arm 52 which carries the 1 mil stylus tip 46, in driving engagement with the yoke member 36. To set the pickup for playing, ordinary 78 r.p.m. records, which requires a 3 mil stylus, the manual control arm 78 is pushed downwardly causing the stylus damping bar 76 to engage both of the stylus arms 52 and 56. Further downward movement of the manual control arm 78 pushes the stylus arm 52 clear of the yoke member 36. When the upper end 82 of the positioning arm 80 is adjacent the base of U-shaped keyway 84, the manual control arm 78 can be moved laterally until stopped by the keyway whereupon the stylus arm 56 will be directly under the reentrant portion of the yoke member 36. By releasing the manual control arm 78, the control lever 44 moves upwardly due to its resiliency to the normal position causing the stylus arm 56 to engage the yoke 36 in driving relation. The stylus arm 52 in such case remains seated in the notch provided therefor in the stylus damping bar 76. This setting of the stylus assembly is shown in FIGURE 4.

It will be noted from FIGURE 2 of the drawings that in the driving position, the stylus arm axis is generally parallel to the axis of the transducing elements 28 and 30. This permits the vibrations imparted to the stylus to be more efficiently transmitted to the transducing elements. The transducing elements 28 and 30 and the driving stylus arm are positioned to extend downwardly to provide the necessary clearance between the stylus and the bottom of the pickup casing to scan a record 90 positioned on a turntable 92 with no danger of any portion of the pickup casing engaging the record being played.

Figures 4, 5:
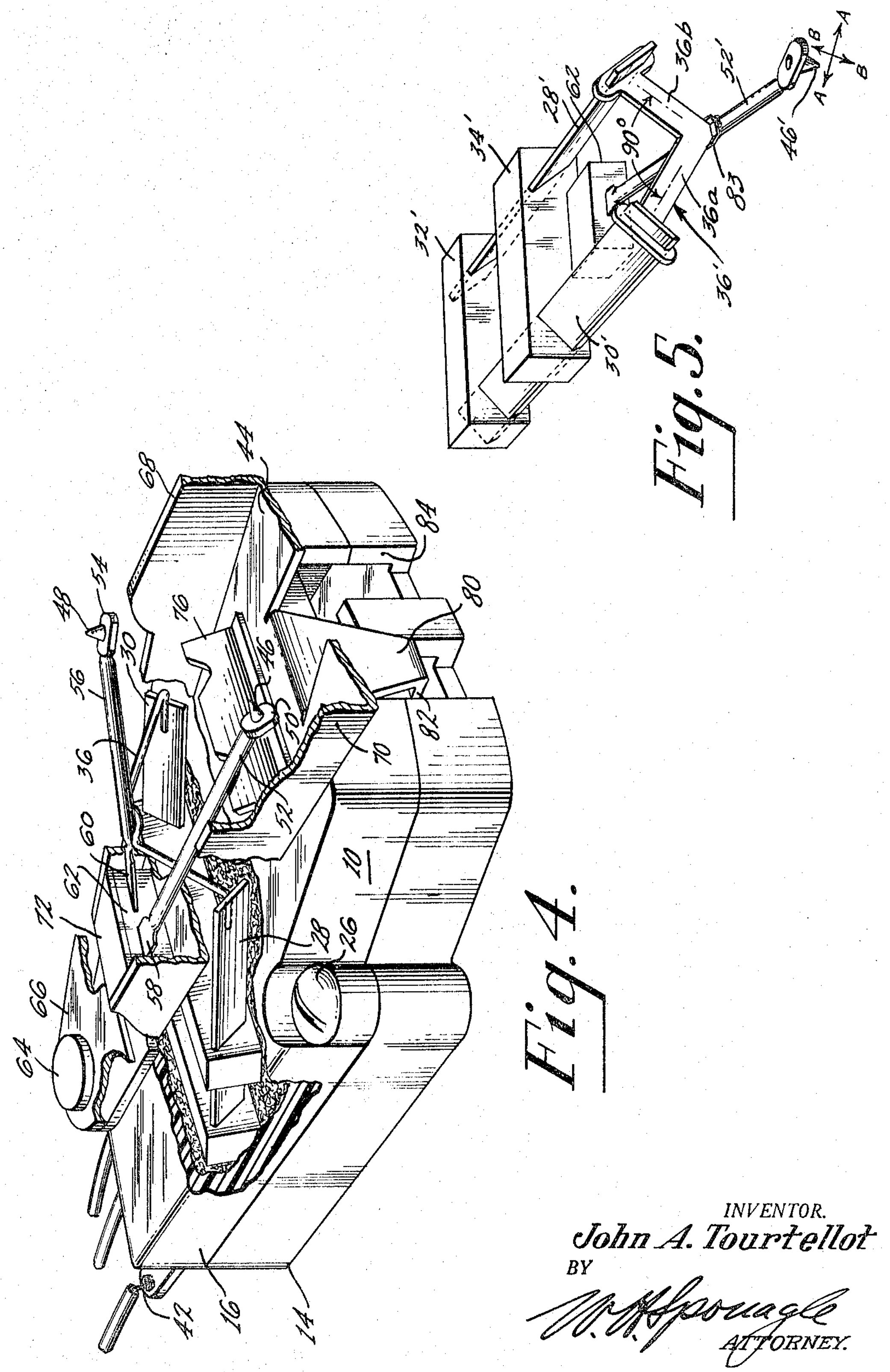
FIGURE 4 is a perspective view partly broken away, from the bottom of the phonograph pickup shown in FIGURES 1 to 3.
FIGURE 5 is a perspective view of the operating elements of a phonograph pickup illustrating another embodiment of the invention.

FIGURE 5 shows a modification of the transducing system of the pickup described in connection with FIGURES 1 to 4, with only a single stylus arm 52′ positioned in driving relation to the yoke member 36′. The yoke member 36' is formed of a plastic such as viscoloid, or polyvinylchloride, and has a pair of apertures for receiving the transducing elements 28' and 30'. If a simple yoke construction is desired, the apertures may be omitted, and the transducing elements may be simply cemented to appropriately formed surfaces on the plastic yoke member. The yoke member 36' has a pair of divergent legs 36a and 36b which are stiff axially; but flexibly in directions normal to said axis. In the embodiment of FIGURE 5, the stylus arm 52' includes a clip 83 for clamping onto the bottom of the yoke member 36', for transmitting vibrations thereto.

This pickup and the pickup shown in FIGURES 1 to 4 are primarily designed for use with records having two recordings cut at right angles to each other in the same record groove with each recording being cut at an angle at 45° with respect to the record surface. For example, one of the recordings would be cut in the direction as indicated by the arrows A—A (FIGURE 5), and the other in the direction indicated by the arrows B—B. The stylus 46' in following the undulations of a groove having only the channel A—A recording would move back and forth generally in a line coincident with the axis of the leg 36a, which is affixed to the transducing element 30'. Since the leg 36a is stiff axially, these vibrations will be directed through the stylus arm 52' and the leg 36a to the transducing element 30'. At the same time, this motion is generally in a plane perpendicular to the axis of the leg 36b of the yoke member 36', which is affixed to the transducing element 28. Since the leg 36b is flexible in all directions perpendicular to the axis thereof as mentioned above, the leg 36b flexes back and forth with the motion of the stylus arm 52' and causes substantially no bending of the transducing element 28'.

The same action occurs for recordings cut at an angle indicated by the arrows B—B except that the vibrations are readily transmitted to the transducing element 28' with negligible effect on the transducing element 30'. Naturally, with recordings in both channels, the movement of the stylus arm 52' is complex causing motion which has components that cause bending of both the transducing elements 28' and 30'. For example, if like in phase signals are simultaneously recorded in channels A and B, the net effect will be to move the stylus arm 52' up and down in a vertical plane. This produces equal axial components of motion which are directed along the legs 36a and 36b of the yoke member so that equal bending of the transducing elements 28' and 30' occurs, and accordingly corresponding in phase signals of equal amplitude will be derived from the two transducing elements.

If the two signals recorded in channels A—A and B—B are recorded 180° out-of-phase, then the net effect is to move the stylus arm 52' laterally. This produces equal and opposite components in the legs 36a and 36b causing one of the transducing elements to bend up as the other bends down. Accordingly, equal signals 180° out-of-phase will be derived from the two transducing elements.

The pickup described is operable for use with records wherein one of the two separable recordings is cut with vertical undulations, and the other with lateral undulations. In such a case however, a suitable conversion network of the type described in the aforementioned Keller et al. patent must be connected to the terminals 38, 40 and 42 to derive the separate signals corresponding to the separate recordings.

From the foregoing it will be understood that the pickup described is also compatible with presently existing laterally cut and vertically cut records having only a single recording in the second groove, since either lateral or vertical movement of the stylus element produces a response in both of the transducing elements. As mentioned above, for vertical stylus movement the response from the transducing elements is in phase, and for lateral styling movement the responses of the transducing elements are of opposite phase. Thus, by proper connection to the terminals 38, 40 and 42 either vertically or laterally cut single channel records may be reproduced.

The physical size of a pickup cartridge constructed in accordance with the invention is essentially the same as that of presently existing cartridges for single channel records. It can be seen from the foregoing description that the only element required in addition to those required for conventional pickup cartridges is an additional transducing element. Since the transducing elements use the same driving and damping components, it has been found that the frequency response characteristics of both transducing systems is substantially symmetrical without the necessity of tedious compensation techniques to balance these systems. Furthermore, the inherent simplicity of the driving structure comprising the yoke which interconnects the two transducing elements greatly reduces the problems attendant with minimizing cross-talk between the two transducing systems. By mounting the transducing elements and damping blocks having precut apertures, the transducing elements are accurately prepositioned with respect to each other, so that the problem of positioning and mounting the driving yoke for optimum drive characteristics and minimum cross-talk between the two transducing systems is greatly simplified.

What is claimed is:

1. A stereophonic phonograph pickup for use with 45-45 stereophonic phonograph records including support means, an elongated stylus arm carrying a record engaging stylus at one end, and a two-channel discriminating energy-transforming system including a coupling member and two electrostrictive transducer means both having a longitudinal axis, said coupling member including at least two flexurally compliant longitudinally extending elements joined to provide a reentrant central portion at their one ends and having remote portions extending divergently away from said reentrant central portion, the respective divergent portions of said coupling member being disposed in directions normal to each other and at an angle of substantially 45° with respect to the surface of a record, said longitudinally extending elements including their remote portions being disposed in a common plane, each said transducer means having a mounting portion and a driven portion remote from said mounting portion and being responsive to displacement of said driven portion by said coupling member to provide electrical signals, means to support the mounting portion of said transducers on the support means with the longitudinal axes of said transducers extending in parallel relation, means to mount the remote portions of said elements respectively on the driven portions of said transducers so that said common plane is substantially perpendicular to a plane passing through said longitudinal axes, means for mounting the end of said stylus arm remote from said record engaging stylus on said support means with said stylus arm extending generally parallel to said longitudinal axes and with an intermediate portion of said stylus arm operatively engaging said reentrant central portion, said reentrant central portion proportioned so that said stylus arm passes through the intersection of a projection of said longitudinally extending elements.

2. In a phonograph pickup for use with records of the type having a pair of recordings cut in the same record groove at right angles to each other with each being at an angle of 45° with respect to the record surface, a pickup casing having a longitudinal axis, a pair of elongated piezoelectric transducing elements each having a rectangular cross-section, a damping block of resilient material located in said pickup casing, means providing a pair of slots in said damping block for receiving the ends of said transducing elements to locate the longitudinal axes of said transducing elements generally parallel to the longitudinal axis of said pickup casing and the major surfaces of said transducing elements in perpendicular planes each intersecting a vertical plane extending through the longitudinal axis of said pickup casing at an angle of about 45°, a unitary driving yoke for said transducing elements comprising a member having legs diverging at an angle of about 90° and a reentrant central portion, the legs of said yoke being rigid axially but flexible in a plane normal to the axis of said legs, said yoke generally lying in a plane normal to the axis of said transducing elements with the free end of each of said legs engaging a different one of said transducing elements, a stylus arm yieldingly anchored at one end thereof with respect to said transducing elements and having a record engaging tip at the opposite end thereof, said stylus arm positioned to extend along the longitudinal axis of said pickup so that a portion thereof is in engagement with the reentrant portion of said yoke, said reentrant central portion proportioned so that said stylus arm passes through the intersection of a straight line projection of the legs of said yoke in the direction away from said transducing elements.

References Cited by the Examiner

UNITED STATES PATENTS

| | | | |
|---|---|---|---|
| 1,855,151 | 4/1932 | Jones | 179—100.41 |
| 2,093,540 | 9/1937 | Blumlein | 179—100.41 |
| 2,114,471 | 4/1938 | Keller et al. | 179—100.41 |
| 2,185,966 | 1/1940 | Pfanstiel | 310—8.6 |
| 2,328,952 | 9/1943 | Burt | 179—100.41 |
| 2,363,497 | 11/1944 | Begun | 179—100.41 |
| 2,439,499 | 4/1948 | Williams | 100—41 |
| 2,496,484 | 2/1950 | Massa | 100—41 |
| 2,594,841 | 4/1952 | Arndt | 310—8.6 |
| 2,717,929 | 9/1955 | Klingener | 179—100.41 |
| 2,775,460 | 12/1956 | Shivack | 179—100.41 |
| 2,991,331 | 7/1961 | Ross | 179—100.41 |
| 3,055,989 | 9/1962 | Bachman et al. | 179—100.41 |

FOREIGN PATENTS

| | | |
|---|---|---|
| 686,777 | 1/1953 | Great Britain. |

OTHER REFERENCES

Batsch, German printed application T11092, Dec. 13, 1956.

BERNARD KONICK, *Primary Examiner.*

L. MILLER ANDRUS, NEWTON N. LOVEWELL, IRVING L. SRAGOW, *Examiners.*

J. R. HOPKINS, H. S. WILLIAMS, M. S. GITTES, *Assistant Examiners.*